Oct. 17, 1939.  H. KRONSON ET AL  2,176,767
VOTING MACHINE INSTRUCTION DEVICE
Filed May 3, 1939  2 Sheets-Sheet 1
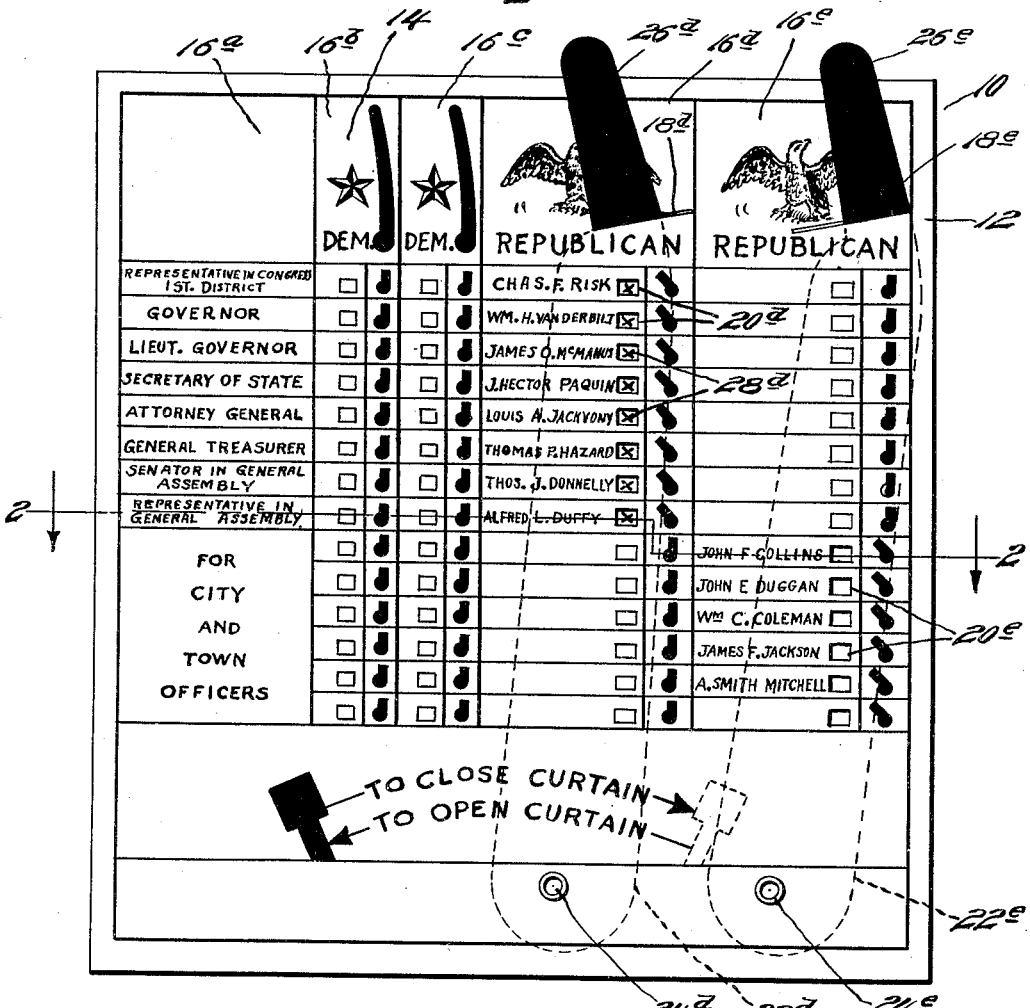

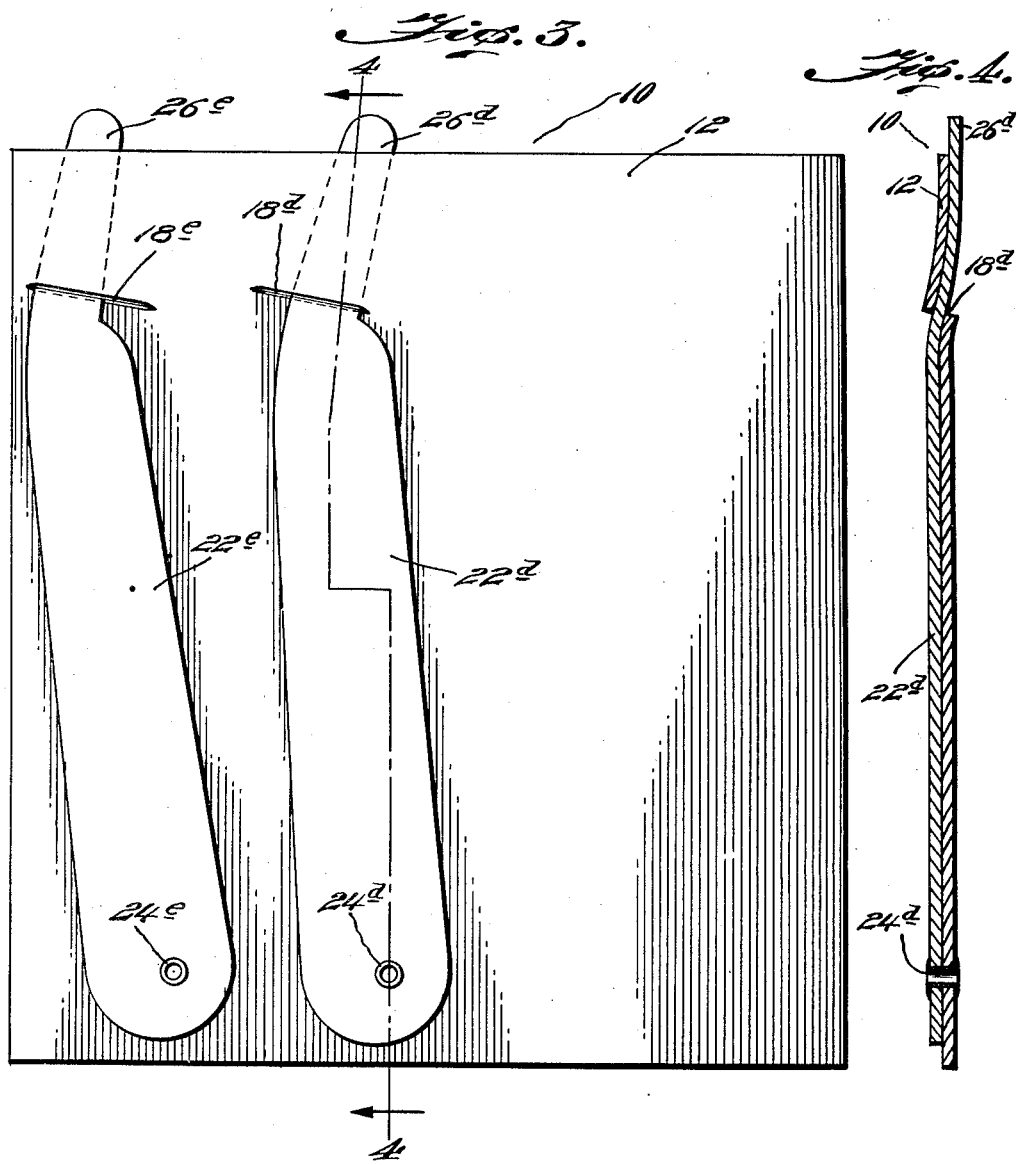

Patented Oct. 17, 1939

2,176,767

UNITED STATES PATENT OFFICE 2,176,767

VOTING MACHINE INSTRUCTION DEVICE

Herman Kronson and Benjamin F. Harley, Providence, R. I.

Application May 3, 1939, Serial No. 271,466

2 Claims. (Cl. 35—1)

Our invention relates to improvements in devices for use in instructing voters in the correct manipulation of a Shoup or other type of voting machine.

While our invention may be adapted for use for the general instruction of voters for the correct manipulation or operation of a voting machine, it is particularly adapted for use in instructing a voter to vote a straight ticket for one particular party and is preferably constructed specifically with this in view. Where voting machines have been employed, great difficulty has been experienced in teaching voters how to vote thereon. Voting machines were first installed in Rhode Island in the 1936 presidential election. A record is kept of a voter entering the machine as well as the actual ballots cast. In the 1936 election, taking a few typical districts, over 15% of the voters who entered the machine failed to register a ballot. By the use of the applicants' invention, which was employed by the Republican party in the 1938 non-presidential election from a few scattered districts it is estimated that due to the use of the applicants' invention in the 1938 election only about 8% of the voters entering the machine did not cast a ballot. Thus by the use of the applicants' device the lack of the efficiency of the machines was decreased substantially 50%.

An object of our invention therefore, is to provide an instruction device which will increase the efficiency of the voting machines.

A further object of our invention is to provide a device which, when constructed in accordance with the specific embodiment shown will increase the votes for any particular party employing it.

A main object of our invention is to provide a device which will not only simulate the appearance of the front of a voting machine, preferably in distorted fashion, but will also simulate the manipulation of the levers thereof to vote a straight ticket.

These and such other objects of our invention as may hereinafter appear will be best understood from a description of an embodiment thereof, such as is shown in the accompanying drawings.

In the drawings,

Fig. 1 is a front elevation of a voting machine instruction device constructed in accordance with our invention showing one lever in a voting position and the other lever in a non-voting position.

Fig. 2 is a horizontal sectional view taken along the line 2—2 of Fig. 1.

Fig. 3 is a rear elevational view thereof.

Fig. 4 is a vertical sectional view thereof taken along the line 4—4 of Fig. 3.

In the drawings, wherein like characters of reference indicate like parts throughout, 10 generally indicates a device for use in instructing a voter in the correct manipulation of a Shoup or other voting machine to vote a straight ticket. Said device includes a sheet 12 of relatively stiff material, such as cardboard having a representation 14 of the exterior of a voting machine, normally opposite the voter in voting position. Said representation 14 includes vertically extending columns 16 extending across the sheet. In the embodiment shown, the first column $16^a$ may have printed therein the offices to which the various candidates desire election. The second and third columns $16^b$ and $16^c$ are respectively for the State officer and town officers of one party. The fourth and fifth columns $16^d$ and $16^e$ are respectively for the State and town officers of the opposing party. In the embodiment shown, the columns $16^d$ and $16^e$ for one party are of greater width than those for the opposite party and said columns are otherwise emphasized or distorted to emphasize that particular party. Each of the columns $16^b$, $16^c$, $16^d$ and $16^e$ are adapted to have inserted therein the names of the respective candidates for said respective party, one below the other, thus providing a column of names for the candidates for the two different parties for both types of offices. In the embodiment shown, the actual names are only written out in the columns $16^d$ and $16^e$ in the desire to emphasize that particular party and call attention to the voter to the effect that those are the names for whom he is requested to vote. Thus in the embodiment shown, the columns $16^d$ and $16^e$ will include columns of candidates' names for one party. In the embodiment shown a transverse slot 18 is provided in said sheet 12 above each respective column of names $16^d$ and $16^e$ at substantially the pivot point of the voting lever for voting a straight party ticket in the actual voting machine. Each of the emphasized columns $16^d$ and $16^e$ is provided with a column of windows $20^d$ and $20^e$, each respective window being after each respective name in each column. Levers $22^d$ and $22^e$ respectively are provided for each respective column $16^d$ and $16^e$ pivotally mounted on said sheet as by the rivets $24^d$ and $24^e$ below each respective column $16^d$ and $16^e$ and extend respectively upwardly in rear of said sheet and terminate in handle portions $26^d$ and $26^e$ at the upper end thereof of less width than and extending through the respective slots $18^d$ and $18^e$ and for manipulation purposes in front of said sheet 12 above said respective slots. The front portion of each lever in rear of said sheet is provided with a column of vote marks 28$^d$ and 28$^e$ respectively such as the crosses shown thereon. It is thus obvious that on pivotal movement of the lever handle 26$^d$ in front of said sheet, said lever may be moved in rear of said sheet by amounts limited by the width of the slot 18$^d$ to and from positions displaying said column of voting marks 28$^d$ through said column of windows 20$^d$. In the embodiment shown, the lever 22$^d$ is moved to a voting position displaying said column of voting marks 28$^d$ through said column of windows 20$^d$, the movement of the handle 26$^d$ being limited by the left hand edge of the slot 18$^d$ and the lever 22$^e$ is pivoted to a position in which the blank portion of the front wall of the lever only is visible through the column of the windows 20$^e$, the pivotal movement of the handle 26$^e$ to blank position being limited by the right hand edge of the slot 18$^e$.

It is thus obvious that if it be desired to vote, the handle 26$^e$ may be moved from the position shown in the right hand column 16$^e$ to the left to a position similar to that of the handle 22$^d$ shown in the next adjacent column 16$^d$, this pivotal movement of the lever thereby bringing the column of voting marks 28$^e$ into position in said respective windows 20$^e$ to effect instruction. It is then obvious that if it be desired to clear the machine it is merely necessary to move the lever 26$^e$ to the right from a position like that shown in the column 16$^d$ to the position shown in the column 16$^e$ for further use by another voter.

It is thus apparent that we have provided a novel type of device for use in instructing voters in the correct manipulation of a Shoup or other type of voting machine to vote a straight ticket, particularly adapted for use in instructing voters to vote for the candidates of one particular party with the other advantages explained above.

It is understood that our invention is not limited to the specific embodiment shown and that various deviations may be made therefrom without departing from the spirit and scope of the appended claim.

What we claim is:

1. A device for use in instructing a voter in the correct manipulation of a Shoup or other voting machine to vote a straight ticket, comprising a sheet of relatively stiff material having a representation of the exterior of the voting machine normally opposite the voter in voting position, including columns of candidates' names for each party, at least one of which is distorted to emphasize the candidates of one particular party and having a transverse slot in said column above said names at substantially the pivot point of the straight party voting lever in the actual machine, said column having a column of windows therein after said candidates' names, and a lever pivotally mounted on said sheet below said column extending upwardly in rear of said sheet and terminating in a handle portion at the upper end thereof of less width than and extending through said slot and for manipulation purposes in front of said sheet above said slot, said lever having a column of voting marks such as crosses thereon, whereby on pivotal movement of said lever handle in front of said sheet said lever may be moved in rear of said sheet to and from a position displaying said column of voting marks through said column of windows.

2. A device for use in instructing a voter in the correct manipulation of a Shoup or other voting machine to vote a straight ticket comprising a sheet of relatively stiff material having a representation of the exterior of the voting machine normally opposite the voter in voting position, including a column of candidates' names for one party and having a transverse slot in said column above said names at substantially the pivot point of the straight party voting lever in the actual machine, said column having a column of windows therein after said candidates' names, and a lever pivotally mounted on said sheet below said column extending upwardly in rear of said sheet and terminating in a handle portion at the upper end thereof of less width than and extending through said slot and for manipulation purposes in front of said sheet above said slot, said lever having a column of voting marks such as crosses thereon, whereby on pivotal movement of said lever handle in front of said sheet said lever may be moved in rear of said sheet to and from a position displaying said column of voting marks through said column of windows.

HERMAN KRONSON.
BENJAMIN F. HARLEY.